US012554171B2

(12) United States Patent
Wang et al.

(10) Patent No.: US 12,554,171 B2
(45) Date of Patent: Feb. 17, 2026

(54) APPLICATIONS OF ELECTROCHROMIC DEVICES WITH REFLECTIVE STRUCTURE (71) Applicant: LannRay Optoelectronics (Zhenjiang) Co. Ltd., Zhenjiang (CN)

(72) Inventors: Jian Wang, Fremont, CA (US); Zhao Chen, Camarillo, CA (US); Yan Zhou, Fremont, CA (US)

(73) Assignee: LannRay Optoelectronics (Zhenjiang) Co. Ltd., Yangzhong (CN)

( * ) Notice: Subject to any disclaimer, the term of this patent is extended or adjusted under 35 U.S.C. 154(b) by 0 days.

(21) Appl. No.: 18/405,306

(22) Filed: Jan. 5, 2024

(65) Prior Publication Data
US 2024/0142842 A1 May 2, 2024

Related U.S. Application Data (63) Continuation of application No. 17/694,061, filed on Mar. 14, 2022, now Pat. No. 11,914,261, which is a
(Continued)

(51) Int. Cl.
G02F 1/157 (2006.01)
G02F 1/1523 (2019.01)

(52) U.S. Cl.
CPC .......... G02F 1/1525 (2013.01); G02F 1/157 (2013.01); G02F 2201/346 (2013.01)

(58) Field of Classification Search
CPC .. G02F 1/1525; G02F 1/157; G02F 2201/346; G02F 1/161; G02F 1/155; G02F 1/15; G09G 3/38
(Continued)

(56) References Cited

U.S. PATENT DOCUMENTS 5,138,013 A * 8/1992 Mason ................ C08G 65/336
528/38
6,366,017 B1 4/2002 Antoniadis et al.
(Continued)

FOREIGN PATENT DOCUMENTS

CN 103797411 A 5/2014
JP H11-282023 A 10/1999
(Continued)

OTHER PUBLICATIONS

Third Office Action for Chinese Application No. 202010997679.1 mailed on Apr. 15, 2024.
(Continued)

Primary Examiner — Tuyen Tra
(74) Attorney, Agent, or Firm — Sheppard Mullin Richter & Hampton LLP (57) ABSTRACT Electrochromic devices with reflective structure and related manufacturing methods are provided. One of the electrochromic devices includes a bottom electrode layer, an electrochromic layer on the bottom electrode layer, an electrolyte layer on the electrochromic layer, a charge storage layer on the electrolyte layer, and a top electrode on the charge storage layer. The transmittance of the electrochromic device changes in response to a voltage applied between the bottom electrode layer and the top electrode layer. One of the bottom and the top electrode layers is a reflective conductive layer, while the other being a transparent conductive layer. This electrochromic device has a simplified structure due to the removal of a separated reflective film, which also results in simplified manufacturing process.

11 Claims, 10 Drawing Sheets

Related U.S. Application Data continuation of application No. 16/666,686, filed on Oct. 29, 2019, now Pat. No. 11,300,845.

(58) Field of Classification Search
USPC .................................. 359/265–275; 345/105
See application file for complete search history.

(56) References Cited

U.S. PATENT DOCUMENTS

| | | | |
|---|---|---|---|
| 6,515,787 | B1 | 2/2003 | Westfall et al. |
| 7,362,490 | B2 | 4/2008 | Park |
| 10,061,177 | B2 | 8/2018 | Choi et al. |
| 10,928,699 | B2 | 2/2021 | Park et al. |
| 2003/0137712 | A1 | 7/2003 | Westfall et al. |
| 2007/0097483 | A1 | 5/2007 | Park |
| 2010/0315693 | A1* | 12/2010 | Lam ............... G02F 1/0018 359/275 |
| 2014/0085700 | A1 | 3/2014 | Park |
| 2015/0323849 | A1 | 11/2015 | Han |
| 2016/0147125 | A1* | 5/2016 | Theodore ............ C23C 14/34 349/33 |
| 2016/0291437 | A1* | 10/2016 | Ogawa ............. G02F 1/1506 |
| 2017/0097551 | A1 | 4/2017 | Garcia et al. |
| 2020/0299822 | A1 | 9/2020 | Kim et al. |
| 2020/0363692 | A1 | 11/2020 | He et al. |

FOREIGN PATENT DOCUMENTS

| | | |
|---|---|---|
| JP | 2011164256 A | 8/2011 |
| KR | 20170125573 A | 11/2017 |
| KR | 20190071996 A | 6/2019 |
| WO | 2019066411 A1 | 4/2019 |

OTHER PUBLICATIONS

Decision on Rejection for Chinese Application No. 202010997679.1 mailed on Jul. 31, 2024 with English machine translation.
Extended Search Report for European Application No. 20191620.2 mailed on Feb. 17, 2021, 14 pages.
Communication pursuant to Article 94(3) EPC for European Application No. 20191620.2 mailed on Nov. 9, 2022.
Non-Final Office Action for U.S. Appl. No. 17/694,061 mailed on Jun. 8, 2023.
First Search for Chinese Application No. 202010997679.1 mailed on Jun. 1, 2023.

* cited by examiner

APPLICATIONS OF ELECTROCHROMIC DEVICES WITH REFLECTIVE STRUCTURE

CROSS-REFERENCE TO RELATED APPLICATIONS

This application is a Continuation of U.S. patent application Ser. No. 17/694,061, filed on Mar. 14, 2022, which is a Continuation of U.S. patent application Ser. No. 16/666,686, filed on Oct. 29, 2019 (now issued as U.S. Pat. No. 11,300,845). The entire contents of all of the above-identified applications are incorporated herein by reference.

TECHNICAL FIELD

This application relates generally to technical field of electronics, and more specifically, to electrochromic devices with reflective structures.

BACKGROUND

Electrochromic materials can change their optical characteristics, such as transmittance, reflectance, absorptance or emittance under electrical current or voltage, and thus have numerous applications in scenarios that require devices that have adjustable optical properties (e.g., dimmable devices). For example, dimmable mirrors and dimmable windows that are made of electrochromic materials have been ubiquitously used in various places, including vehicles, airplanes, and buildings, to provide better adaption for different lighting conditions.

The manufacturing of dimmable devices with electrochromic materials, however, remains a challenging task due to complicated processes to deal with various component layers and issues related to sealing and diffusion of electrochromic materials during the manufacturing process. Therefore, an efficient and reliable manufacturing process is desirable.

SUMMARY

In view of the limitations of conventional technologies described above, this inventive concept provides electrochromic devices with reflective structure and related manufacturing methods that address at least some of these limitations.

This inventive concept first provides an electrochromic device. The electrochromic device may include a bottom electrode layer, an electrochromic layer on the bottom electrode layer, an electrolyte layer on the electrochromic layer, a charge storage layer on the electrolyte layer, and a top electrode layer on the charge storage layer. A transmittance of the electrochromic device may change in response to a voltage applied between the bottom electrode layer and the top electrode layer. One of the bottom electrode layer and the top electrode layer may be a reflective conductive layer, and another of the bottom electrode layer and the top electrode layer may be a transparent conductive layer.

In some embodiments, in the aforementioned device, the bottom electrode layer and the top electrode layer may each comprise polyethylene terephthalate (PET) and indium tin oxide (ITO).

In some embodiments, in the aforementioned device, the bottom electrode layer and the top electrode layer may each have a sheet resistance in a range of 0.01 $\Omega$/sq to 200 $\Omega$/sq.

In some embodiments, in the aforementioned device, the transmittance may range from 0.1% to 99%.

In some embodiments, the aforementioned device may further comprise a top glass panel and a bottom glass panel. The bottom electrode layer, the electrochromic layer, the electrolyte layer, the charge storage layer, and the top electrode layer may be sandwiched by the top glass panel and the bottom glass panel.

This inventive concept further provides another electrochromic device. The electrochromic device may include a bottom electrode layer, an electrochromic layer on the bottom electrode layer, an electrolyte layer on the electrochromic layer, a charge storage layer on the electrolyte layer, a top electrode layer on the charge storage layer, a top glass panel and a bottom glass panel. The bottom electrode layer, the electrochromic layer, the electrolyte layer, the charge storage layer, and the top electrode layer may be sandwiched by the top glass panel and the bottom glass panel. The electrochromic device may further include a reflective layer located either on a side of the top glass panel contacting the top glass panel or on a side of the bottom glass panel contacting the bottom glass panel. A transmittance of the electrochromic device changes in response to a voltage applied between the bottom electrode layer and the top electrode layer.

In some embodiments, in the aforementioned device, the reflective layer may be a metallic layer made of Ag, Al, Cr, or Au, or a Bragg mirror comprising a plurality of dielectric layers.

In some embodiments, in the aforementioned device, the bottom electrode layer and the top electrode layer may each have a sheet resistance in a range of 0.01 $\Omega$/sq to 200 $\Omega$/sq.

In some embodiments, in the aforementioned device, the transmittance may range from 0.1% to 99%.

This inventive concept further provides an electrochromic device manufacturing method. The method may include: providing a top electrode layer, forming a charge storage layer on the top electrode layer, providing a bottom electrode layer, forming an electrochromic layer on the bottom electrode layer, and forming an electrolyte layer sandwiched by the charge storage layer and the electrochromic layer. The electrochromic layer, the electrolyte layer, and the charge storage layer may be sandwiched by the top electrode layer and the bottom electrode layer. A transmittance of the electrochromic device may change in response to a voltage applied between the bottom electrode layer and the top electrode layer.

In some embodiments, in the aforementioned method, the bottom electrode layer and the top electrode layer may each have a sheet resistance in a range of 0.01 $\Omega$/sq to 200 $\Omega$/sq.

In some embodiments, in the aforementioned method, the forming a charge storage layer on the top electrode layer may comprise depositing the charge storage layer on the top electrode layer using a wet process, such as spin-coating, ink-jetting, slot-die coating, dip-coating, gravure-coating, spray-coating, blade-coating, screen printing, mayer bar coating, relief printing, etc., and the forming an electrochromic layer on the bottom electrode layer may comprise: depositing the electrochromic layer on the bottom electrode layer using a wet process, such as spin-coating, ink-jetting, slot-die coating, dip-coating, gravure-coating, spray-coating, blade-coating, screen printing, mayer bar coating, relief printing, etc.

In some embodiments, in the aforementioned method, the forming an electrolyte layer sandwiched by the charge storage layer and the electrochromic layer may comprise: depositing the electrolyte layer on the electrochromic layer, laminating the charge storage layer along with the top electrode on the electrolyte layer, and curing the electrolyte layer.

In some embodiments, in the aforementioned method, the forming an electrolyte layer sandwiched by the charge storage layer and the electrochromic layer may comprise: depositing the electrolyte layer on the charge storage layer, laminating the electrochromic layer along with the bottom electrode on the electrolyte layer, and curing the electrolyte layer.

In some embodiments, in the aforementioned method, the forming an electrolyte layer sandwiched by the charge storage layer and the electrochromic layer may include: fixing the top electrode layer to the bottom electrode layer, with the charge storage layer and the electrochromic layer located between the top electrode layer and the bottom electrode layer and separated by a space; and filling the space with electrolyte liquid by a vacuum-and-siphon process to form the electrolyte layer. The vacuum-and-siphon process may include: providing edge seals at edge areas of the electrochromic layer and the charge storage layer to seal the space, vacuuming the space, and siphoning electrolyte liquid to fill the space.

In some embodiments, the aforementioned method may further include: forming a top glass panel, a bottom glass panel and a reflective layer. The bottom electrode layer, the electrochromic layer, the electrolyte layer, the charge storage layer, and the top electrode layer may be sandwiched by the top glass panel and the bottom glass panel. The reflecting layer may be located on a side of the top glass panel contacting the top glass panel, or on a side of the bottom glass panel contacting the bottom glass panel.

In some embodiments, in the aforementioned method, the reflective layer may be a metallic layer made of Ag, Al, Cr, or Au.

In some embodiments, in the aforementioned method, the reflective layer may be a Bragg mirror comprising a plurality of dielectric layers.

In some embodiments, in the aforementioned method, one of the bottom electrode layer and the top electrode layer may be a reflective conductive layer, and the other of the bottom electrode layer and the top electrode layer may be a transparent conductive layer.

In some embodiments, the aforementioned method may further include: forming a top glass panel and a bottom glass panel. The bottom electrode layer, the electrochromic layer, the electrolyte layer, the charge storage layer, and the top electrode layer may be sandwiched by the top glass panel and the bottom glass panel.

In some disclosed electrochromic devices, one of the top electrode layer and the bottom electrode layer may be a reflective layer for reflecting light, while the other may be a transparent layer. These devices have a simplified structure due to the removal of a dedicated reflective layer, which may also result in simplified manufacturing process since the process of pasting a reflective film in the electrochromic device is no longer necessary. Additionally, this inventive concept discloses using a vacuum-and-siphon process to form the electrolyte layer, which may further improve the efficiency of manufacturing process.

These and other features of the systems, methods, as well as the methods of operation and functions of the related elements of structure will become more apparent upon consideration of the following description and the appended claims with reference to the accompanying drawings, all of which form a part of this specification. Like reference numerals in the drawings may designate corresponding parts in the various figures. It is to be expressly understood that the drawings are for purposes of illustration and description only and are not intended as a definition of the limits of the inventive concept. It is to be understood that the foregoing general description and the following detailed description are exemplary and explanatory only, and are not restrictive of the inventive concept, as claimed.

BRIEF DESCRIPTION OF THE DRAWINGS

Preferred and non-limiting embodiments of this inventive concept may be more readily understood by referring to the accompanying drawings. The accompanying drawings, which are incorporated in and constitute a part of the description, illustrate embodiments in accordance with this inventive concept and, together with the description, serve to explain the disclosed inventive concept. It is apparent that these drawings present only some embodiments of the inventive concept and persons of ordinary skill in the art may obtain drawings of other embodiments from them without creative effort.

DETAILED DESCRIPTION OF THE INVENTION

Specific, non-limiting embodiments of the present invention will now be described with reference to the drawings. Particular features and aspects of any embodiment disclosed herein may be used and/or combined with particular features and aspects of any other embodiment disclosed herein. It should be understood that such embodiments are by way of example and are merely illustrative of a number of embodiments within the scope of the present invention. Various changes and modifications obvious to one skilled in the art to which the present invention pertains are deemed to be within the spirit, scope and contemplation of the present invention as further defined in the appended claims.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

Figure 1:
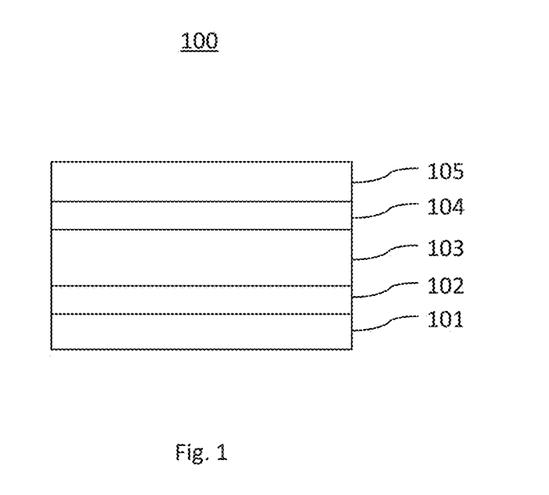
FIG. 1. is a schematic diagram of an electrochromic device in accordance with one embodiment of this inventive concept.

FIG. 1. is a schematic diagram of an electrochromic device in accordance with one embodiment of this inventive concept. Referring to FIG. 1, the electrochromic device 100 may include an electrochromic layer 102, an electrolyte layer 103 on the electrochromic layer 102, and a charge storage layer 104 on the electrolyte layer 103. In some embodiments, the electrochromic device 100 may further include a first substrate 101 beneath the electrochromic layer 102, and a second substrate 105 on the charge storage layer 104. That is, the electrochromic layer 102, the solid electrolyte layer 103, and the charge storage layer 104 may be sandwiched by the first substrate 101 and the second substrate 105.

The first substrate 101 and the second substrate 105 may be made of conductive materials and may work as a bottom electrode layer and a top electrode layer of the electrochromic device 100, respectively. Thus, the first substrate 101 may be termed the bottom electrode layer 101, and the second substrate 105 may be termed the top electrode layer 105 in the rest of the application. A voltage may be applied between the bottom electrode layer 101 and the top electrode layer 105, and a transmittance of the electrochromic device may change in response to the voltage applied between the bottom electrode layer 101 and the top electrode layer 105.

In some embodiments, the bottom electrode layer 101 and the top electrode layer 105 may each comprise polyethylene terephthalate (PET) and indium tin oxide (ITO), and may each have a sheet resistance in a range of 0.01 Ω/sq to 200 Ω/sq.

In some embodiments, depending on the voltage applied between the bottom electrode layer 101 and the top electrode layer 105, the transmittance of the electrochromic film may range from 0.01% to 99%.

In some embodiments, one of the bottom electrode layer 101 and the top electrode layer 105 may be a reflective conductive layer, and the other of the bottom electrode layer 101 and the top electrode layer 105 may be a transparent conductive layer.

The electrochromic device 100 may comprise two states, a bright state and a dimming state, which may have different reflectivity properties.

Figure 2:
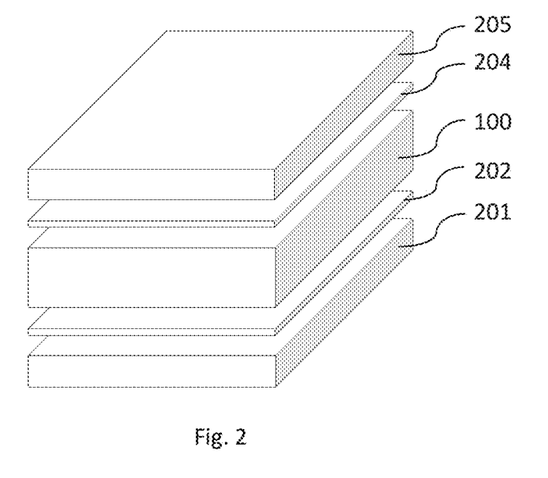
FIG. 2. is a three-dimensional exploded structural diagram illustrating an electrochromic device in accordance with one embodiment of this inventive concept.

FIG. 2. is a three-dimensional exploded structural diagram illustrating an electrochromic device in accordance with one embodiment of this inventive concept. Referring to FIG. 2, in some embodiments, the electrochromic device of FIG. 2 may include the electrochromic device 100 of FIG. 1, and may further include a bottom glass panel 201 and a top glass panel 205. The electrochromic device 100 of FIG. 1 may be sandwiched by the bottom glass panel 201 and the top glass panel 205. That is, the bottom electrode layer, the electrochromic layer, the electrolyte layer, the charge storage layer, and the top electrode layer may be sandwiched by the bottom glass panel 201 and the top glass panel 205. The bottom glass panel 201 and the top glass panel 205 may be adhered to the electrochromic device 100 of FIG. 1 through adhesive layers 202/204. In one example, the adhesive layers 202/204 may be any optically clear adhesive (OCA), PVB, EVA, SentryGlas, etc.

Figure 3A:
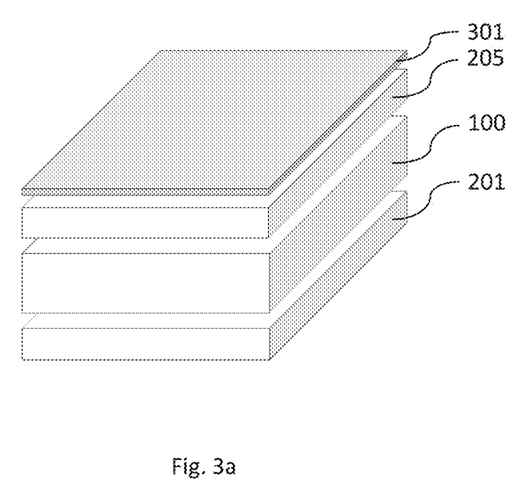
FIGS. 3*a* and 3*b* are three-dimensional exploded structural diagrams illustrating electrochromic devices in accordance with one or more embodiments of this inventive concept.
Figure 3B:
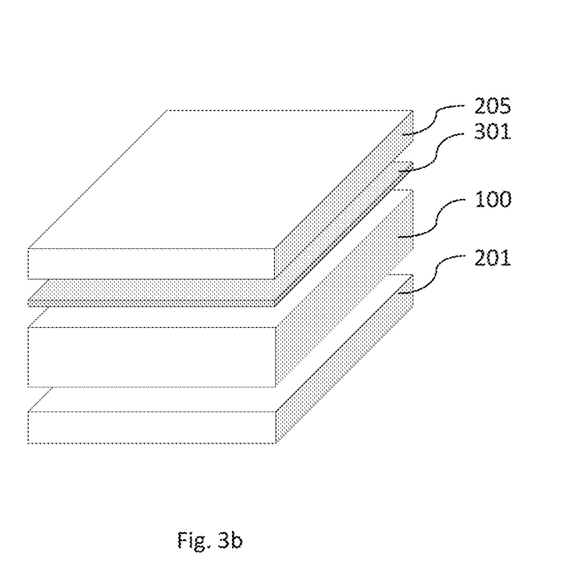

FIGS. 3a and 3b are three-dimensional exploded structural diagrams illustrating electrochromic devices in accordance with one or more embodiments of this inventive concept. Referring to FIGS. 3a and 3b, in some embodiments, the electrochromic device may include the electrochromic device of FIG. 2 (the adhesive layers 202/204 are omitted in FIGS. 3a and 3b), and additionally include a reflective layer 301. The reflective layer 301 may be located either on a upper side of the top glass 205 panel contacting the top glass panel 205 (as shown in FIG. 3a), or on a bottom side of the top glass panel 205 contacting the top glass panel 205 (as shown in FIG. 3b). Alternatively, the reflective layer 301 may also be located on a side (either an upper side or a bottom side) of the bottom glass panel 201 contacting the bottom glass panel 201. Specific locations of the reflective layer 301 may be determined based on actual requirements and are not limited herein.

In some embodiments, the reflective layer 301 may be made of one or more metallic materials including, but not limited to, silver (Ag), aluminum (Al), chromium (Cr), gold (Au), other suitable metallic material, or any combination thereof. In some embodiments, the reflective layer 301 may be a Bragg mirror comprising a plurality of dielectric layers. When an electrochromic device includes a dedicated reflective layer as shown, for example, in FIGS. 3a and 3b, both the bottom electrode layer and the top electrode layer will be a transparent conductive layer.

In the embodiments shown in FIGS. 3a and 3b, a dedicated reflective layer 301 is provided to reflect light. In some embodiments, the reflective layer 301 may be removed and one of the bottom electrode layer and the top electrode layer may work as the reflective layer to reflect light. These embodiments will be described below with reference to FIGS. 4a and 4b.

Figure 4A:
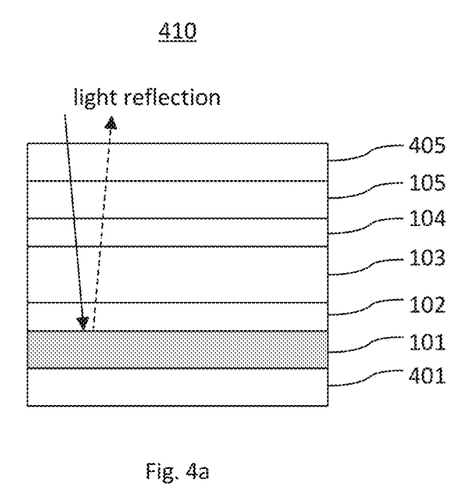
FIGS. 4*a* and 4*b* are schematic diagrams of electrochromic devices in accordance with one or more embodiments of this inventive concept.
Figure 4B:
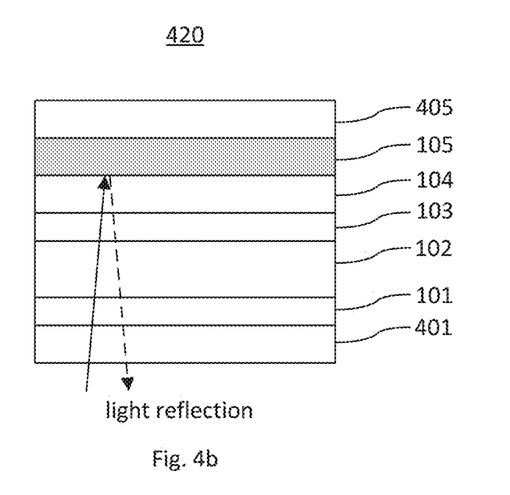

FIGS. 4a and 4b are schematic diagrams of electrochromic devices in accordance with one or more embodiments of this inventive concept. As shown in FIG. 4a, in some embodiments, the electrochromic device 410 may include a bottom electrode layer 101, an electrochromic layer 102 on the bottom electrode layer 101, a solid electrolyte layer 103 on the electrochromic layer 102, a charge storage layer 104 on the electrolyte layer 103, and a top electrode layer 105. The characteristics and the relative positional relationship of these component layers may be the same as those disclosed in the aforementioned embodiments and thus will not be repeated herein.

As shown in FIG. 4a, in the electrochromic device 410, the bottom electrode layer 101 may be a reflective conductive layer that reflects incoming light, and the top electrode layer 105 may be a transparent conductive layer that allows incoming light to pass through. Thus incoming light (indicated by a solid arrow line in FIG. 4a) to the electrochromic device 410 may go through the top electrode layer 105 and be reflected by the bottom electrode layer 101 (a reflected light is indicated by a dash arrow line in FIG. 4a).

In some embodiments, the solid state electrochromic device 410 may further include a bottom glass panel 401 beneath the bottom electrode layer 101, and a top glass panel 405 on the top electrode layer 105. The bottom and the top glass panels may provide support to the electrochromic device 410 to meet rigidness and toughness requirements of different applications.

In the electrochromic device shown in FIG. 4a, the bottom electrode layer 101 is a reflective layer and the top electrode layer 105 is a transparent layer. This inventive concept, however, is not limited herein. In some embodiments, the bottom electrode layer 101 may be a transparent conductive layer and the top electrode layer 105 may be a reflective conductive layer, as shown in FIG. 4b. The electrochromic device 420 of FIG. 4b may have the same structure as the electrochromic device 410 of FIG. 4a, except that the top electrode layer 105 is a reflective conductive layer, and the bottom electrode layer 101 is a transparent conductive layer. Thus, as shown in FIG. 4b, incoming light (indicated by a solid arrow light in FIG. 4b) to the electrochromic device 410 may go through the bottom electrode layer 101 and be reflected by the top electrode layer 105 (a reflected light is indicated by a dash arrow line in FIG. 4b). The electrochromic device may comprise two states, a bright state and a dimming state, which may have different reflectivity properties.

In the embodiments of FIGS. 4a and 4b, rather than providing a separated reflective layer to reflect light, one of the electrode layers of the electrochromic device may work as a reflect layer to reflect incoming light. Thus, a separated reflective film may be omitted, which simplifies the structure of the electrochromic device and the manufacturing process thereof.

Figure 5:
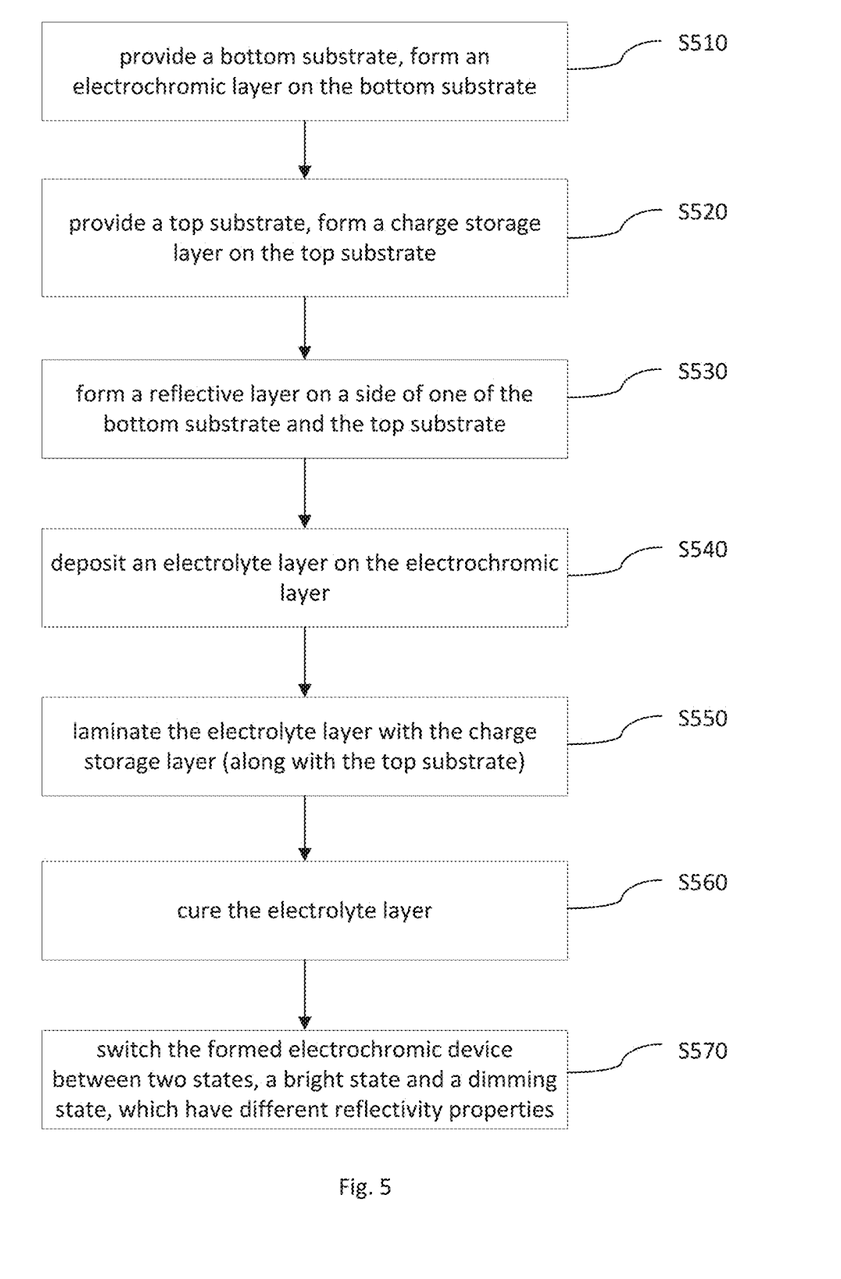
FIG. 5 is a flowchart illustrating an electrochromic device manufacturing method in accordance with one embodiment of this inventive concept.

This inventive concept further provides an electrochromic device manufacturing methods. FIG. 5 is a flowchart illustrating an electrochromic device manufacturing method in accordance with one embodiment of this inventive concept. Referring to FIG. 5, the manufacturing method may include the following steps S510 through S570.

In step S510, a bottom substrate may be provided, and an electrochromic layer may be formed on the bottom substrate.

In step S520, a top substrate may be provided, and a charge storage layer may be formed on the top substrate.

In some embodiments, the bottom substrate and the top substrate may be rigid substrates and may be made of materials including, but not limited to, glass/ITO. In some embodiments, the bottom substrate and the top substrate may be flexible substrates and may be made of materials including, but not limited to, PET/ITO. The bottom substrate and the top substrate may be made of conductive materials and may work as a bottom electrode layer and a top electrode layer of the electrochromic device, respectively, and may each have a sheet resistance in a range of 0.01 Ω/sq to 200 Ω/sq.

In step S530, a reflective layer may be formed on a side of one of the bottom substrate and the top substrate. The reflective layer may be made of one or more metallic materials including, but not limited to, silver (Ag), aluminum (Al), chromium (Cr), gold (Au), other suitable metallic material, or any combination thereof, which is not limited in this inventive concept.

In step S540, an electrolyte layer may be deposited on the electrochromic layer on the electrochromic layer the bottom substrate.

In steps S510 through S540, the electrochromic layer, the charge storage layer, and the electrolyte layer may be formed by deposition, coating, or any other suitable methods that are known to persons or ordinary skills in the art. For example, in some embodiments, the electrochromic layer and the electrolyte layer may be sequentially deposited on the bottom substrate using a wet process, such as spin-coating, ink-jetting, slot-die coating, dip-coating, gravure-coating, spray-coating, blade-coating, screen printing, mayer bar coating, relief printing, etc. The charge storage layer may be deposited on the top substrate using a wet process, such as spin-coating, ink-jetting, slot-die coating, dip-coating, gravure-coating, spray-coating, blade-coating, screen printing, mayer bar coating, relief printing, etc. Specific methods that may be used to form the electrochromic layer, the charge storage layer, and the electrolyte layer are not limited in this inventive concept.

In step S550, the electrolyte layer on the electrochromic layer may be laminated with the charge storage layer (along with the top substrate). After step S550, the electrochromic layer, the electrolyte layer, and the charge storage layer are sandwiched by the bottom substrate and the top substrate.

In step S560, the electrolyte layer may be cured. The electrolyte layer may be cured by UV exposure, heat, pressure, or other suitable methods, and this inventive concept is not limited in this regard. The electrochromic layer, the electrolyte layer, and the charge storage layer may form the electrochromic device. Depending on a voltage applied between the bottom substrate and the top substrate, a transmittance of the electrochromic device may range from 0.1% to 99%.

In the aforementioned embodiment, after the electrochromic layer has been formed on the bottom substrate and the charge storage layer has been formed on the top substrate, the electrolyte layer may be deposited on the electrochromic layer, and then maybe laminated by the charge storage layer (along with the top substrate). This inventive concept is not limited herein. In one example, the electrolyte layer may be deposited on the charge storage layer on the top substrate, and then be laminated by the electrochromic layer (along with the bottom substrate).

After Step 560, a top glass panel and a bottom glass panel may further be provided. The top and the bottom glass panels may sandwich the electrochromic device to provide support to meet rigidness and toughness requirements of different applications. Specific characteristics of component layers may be the same as those described in the aforementioned embodiments, and thus will not be repeated herein. In step 570, the electrochromic device may be switched between two states, a bright state and a dimming state, which have different reflectivity properties as further described in FIG. 8.

In some embodiments, the reflective layer may be located on a side of the top glass panel or a side of bottom glass panel. Alternatively, the electrochromic layer may not necessarily include a separated reflective layer. Instead, one of the bottom substrate and the top substrate may be a reflective layer while the other of the bottom substrate and the top substrate being a transparent layer. Relevant parts of above descriptions may be referred to for details, which is not repeatedly described herein.

Figure 6:
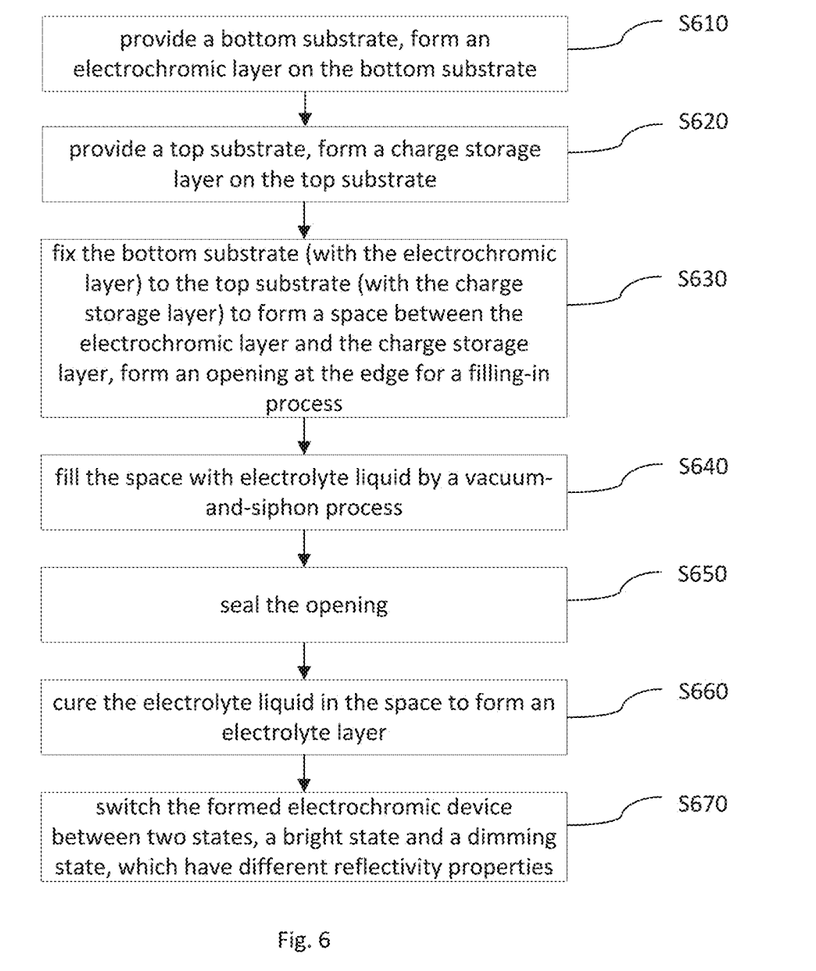
FIG. 6 is a flowchart illustrating an electrochromic device manufacturing method in accordance with one embodiment of this inventive concept.

FIG. 6 is a flowchart illustrating another electrochromic device manufacturing method in accordance with one embodiment of this inventive concept. Referring to FIG. 6, the electrochromic device manufacturing method may include the following steps S610 through S670.

Step S610 and step S620 may be the same with step S510 and step S520, respectively, of the aforementioned embodiment. Relevant parts of the above description may be referred to for details of these steps, which are not repeatedly described herein.

In step S630, the bottom substrate (along with the electrochromic layer formed on it) may be fixed to the top substrate (along with the charge storage layer formed on it), so that a space may be formed between the electrochromic layer and the charge storage layer. The bottom substrate may be fixed to the top substrate by, for example, gluing the bottom substrate to the top substrate. Other methods that can fix the bottom substrate to the top substrate are contemplated, and this inventive concept is not limited herein. A distance d between the electrochromic layer and the charge storage layer may be predetermined. In some embodiments, one or more spacers may be provided to maintain the distance between the electrochromic layer and the charge storage layer. A specific value of the distance may be chosen according to actual requirements, for example, of a specific application, and is not limited herein. An opening may be formed at the edge for a subsequent filling-in process.

Figure 7:
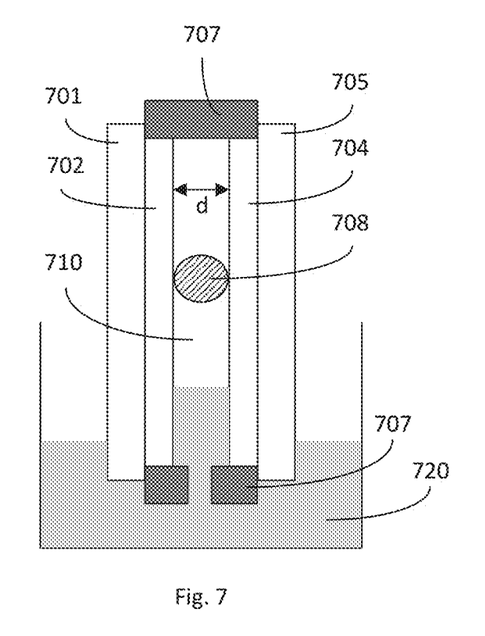
FIG. 7 is a diagram illustrating a vacuum-and-siphon process in accordance with one embodiment of this inventive concept.

In step S640, the space between the electrochromic layer and the charge storage layer may be filled with electrolyte liquid by a vacuum-and-siphon process which is described in FIG. 7.

In step S650, the opening may be sealed after the filling-in process.

In step S660, the electrolyte liquid in the space may be cured to form an electrolyte layer. The electrolyte liquid in the space may be cured by UV exposure, heat, pressure, or other suitable methods, and this inventive concept is not limited in this regard.

Figure 8:
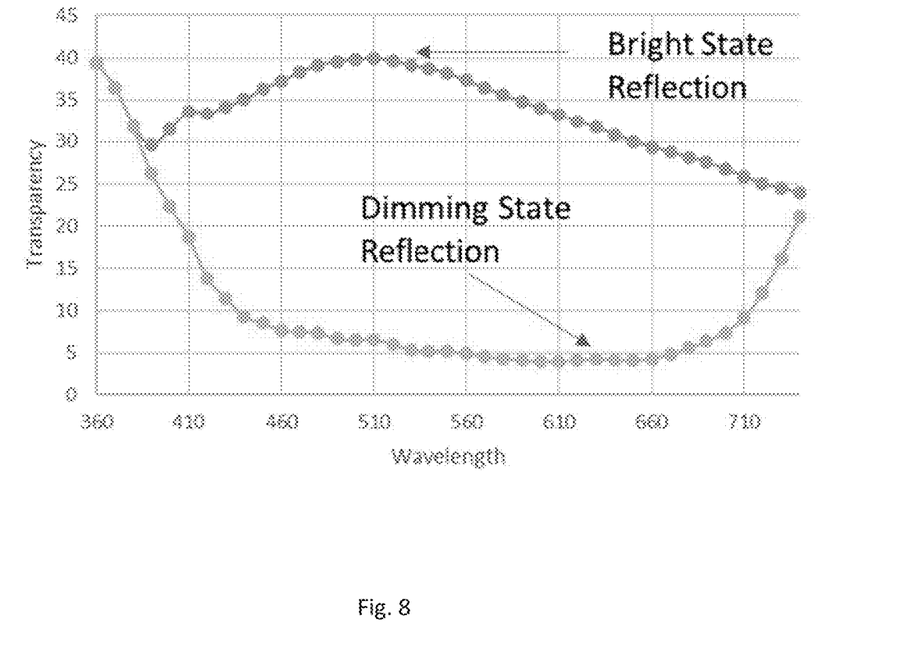
FIG. 8 is a diagram illustrating two distinct modes or states in accordance with embodiments of the electrochromic device described with respect to FIGS. 1, 2, 3*a*, 3*b*, 4*a*, and 4*b*.

In step S670, the electrochromic device may be switched between two states, a bright state and a dimming state, which may have different reflectivity properties, as will be further described in FIG. 8.

FIG. 7 is a diagram illustrating a vacuum-and-siphon process in accordance with one embodiment of this inventive concept. For example, the vacuum-and-siphon process may be implemented in step 640 of FIG. 6. Referring to FIG. 7, the vacuum-and-siphon process may include the following steps. First, after the space 710 is created between the electrochromic layer 702 and the charge storage layer 704, edge seals 707 may be added at edge areas of the electrochromic layer 702 and the charge storage layer 704 to seal the space 710. In some embodiments, one or more spacers 708 may be provided to maintain a distance between the electrochromic layer 702 and the charge storage layer 704. Second, the space 710 may be vacuumed. Vacuuming methods that are well known to persons of ordinary skills in the arts may be used to vacuum the space 710, which is not limited herein. Third, electrochromic solution 720 may be siphoned to the space 710 to fill the space 710, so that an electrolyte layer between the electrochromic layer 702 and the charge storage layer 704 may be formed.

FIG. 8 is a diagram illustrating two distinct modes or states in accordance with embodiments of the electrochromic device described with respect to FIGS. 1, 2, 3a, 3b, 4a, and 4b. In FIG. 8, the two distinct modes or states of the electrochromic device may comprise a bright state and a dimming state between which the electrochromic device may switch. The bright state and the dimming state have different reflective properties at specific wavelengths. In some examples, the electrochromic device in the bright state may have a higher transparency for wavelengths between about 380 nm and 780 nm compared to the electrochromic device in the dimming state.

In some embodiments, the manufacturing method may further include forming a top glass panel and a bottom glass panel that sandwich the electrochromic device. This step may be the same as that described in aforementioned embodiments. Relevant parts in those embodiments may be referred to for details, which will not be repeated herein.

In some embodiments, the manufacturing method may further include forming a reflective layer. The reflective layer may be located on a side of the top glass panel or a side of bottom glass panel. Alternatively, the electrochromic layer may not necessarily include a separate reflective layer. In that case, one of the bottom substrate and the top substrate may be a reflective layer while the other of the bottom substrate and the top substrate may be a transparent layer. Relevant parts of above descriptions may be referred to for details, which will not be repeated herein.

In the manufacturing methods herein disclosed, one of the top electrode layer and the bottom electrode layer may be a reflective layer for reflecting light, while the other may be a transparent layer. These devices have a simplified structure due to the removal of a separate reflective layer. Since the process of pasting a reflective film in the electrochromic device is no longer necessary, the manufacturing process may be simplified. Additionally, in a disclosed manufacturing method, a vacuum-and-siphon process may be used to form the electrolyte layer, which may further improve the efficiency of the manufacturing process.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. An electrochromic device manufacturing method, comprising:
   providing a bottom electrode layer;
   providing a top electrode layer facing the bottom electrode layer;
   forming an electrochromic layer on an interior surface of the bottom electrode layer;
   forming a charge storage layer on an interior surface of the top electrode layer;
   creating a space between the electrochromic layer and the charge storage;
   providing edge seals at edge areas of the electrochromic layer and the charge storage layer to seal the space in-between;
   providing one or more spacers within the space to maintain a predetermined distance between the electrochromic layer and the charge storage layer; and
   vacuuming the space and filling the space with an electrolyte liquid, thereby forming an electrolyte layer.

2. The electrochromic device manufacturing method of claim 1, further comprising:
applying a voltage between the bottom electrode layer and the top electrode layer to change the electrochromic device from between at least a bright state and a dimming state, wherein the bright state has a higher transparency than the dimming state for light wavelengths between 380 nm and 780 nm.

3. The electrochromic device manufacturing method of claim 1, wherein the bottom electrode layer and the top electrode layer each have a sheet resistance in a range of 0.01Ω/sq to 200Ω/sq.

4. The electrochromic device manufacturing method of claim 1, wherein the forming of an electrochromic layer and a charge storage layer comprises:
depositing the charge storage layer on the interior surface of the top electrode layer using a wet process; and
forming the electrochromic layer on the interior surface of the bottom electrode layer by depositing the electrochromic layer on the bottom electrode layer using a wet process.

5. The electrochromic device manufacturing method of claim 1, further comprising:
forming a top glass panel and a bottom glass panel, wherein the bottom electrode layer, the electrochromic layer, the electrolyte layer, the charge storage layer, and the top electrode layer are sandwiched by the top glass panel and the bottom glass panel.

6. The electrochromic device manufacturing method of claim 5, further comprising:
forming a reflective layer on a side of the top glass panel contacting the top glass panel, or on a side of the bottom glass panel contacting the bottom glass panel.

7. The electrochromic device manufacturing method of claim 6, wherein the reflective layer is a metallic layer made of Ag, Al, Cr, or Au.

8. The electrochromic device manufacturing method of claim 6, wherein the reflective layer is a Bragg mirror comprising a plurality of dielectric layers.

9. The electrochromic device manufacturing method of claim 1, wherein one of the bottom electrode layer and the top electrode layer is a reflective conductive layer, and the other of the bottom electrode layer and the top electrode layer is a transparent conductive layer.

10. The electrochromic device manufacturing method of claim 9, further comprising:
forming a top glass panel and a bottom glass panel, wherein the bottom electrode layer, the electrochromic layer, the electrolyte layer, the charge storage layer, and the top electrode layer are sandwiched by the top glass panel and the bottom glass panel.

11. The electrochromic device manufacturing method of claim 1, further comprising:
curing the electrolyte liquid by UV exposure, heat or pressure.

* * * * *